United States Patent
Gleixner et al.

(10) Patent No.: US 6,756,779 B2
(45) Date of Patent: Jun. 29, 2004

(54) INDUCTIVE MEASURING TRANSDUCER FOR DETERMINING THE RELATIVE POSITION OF A BODY

(75) Inventors: Franz Gleixner, Röhrmoos (DE); Stefan Sester, Deizisau (DE)

(73) Assignee: Horst Siedle GmbH & Co. KG (DE)

( * ) Notice: Subject to any disclaimer, the term of this patent is extended or adjusted under 35 U.S.C. 154(b) by 0 days.

(21) Appl. No.: 10/275,720

(22) PCT Filed: Apr. 24, 2001

(86) PCT No.: PCT/DE01/01557

§ 371 (c)(1),
(2), (4) Date: Nov. 7, 2002

(87) PCT Pub. No.: WO01/86233

PCT Pub. Date: Nov. 15, 2001

(65) Prior Publication Data

US 2003/0137294 A1 Jul. 24, 2003

(51) Int. Cl.$^7$ .............................. G01D 5/20; G01B 7/00; G01B 7/30
(52) U.S. Cl. ............................. 324/207.17; 324/207.12; 324/207.24; 324/207.25
(58) Field of Search .......... 324/207.12, 207.15–207.19, 324/207.22, 207.24, 207.25; 340/870.31–870.34, 870.38; 341/15, 16; 336/117–120, 130

(56) References Cited

U.S. PATENT DOCUMENTS

| | | | |
|---|---|---|---|
| 5,055,814 A | | 10/1991 | Morimura et al. |
| 5,323,109 A | | 6/1994 | Mehnert et al. |
| 5,475,302 A | * | 12/1995 | Mehnert et al. ........ 324/207.17 |
| 5,629,619 A | * | 5/1997 | Mednikov .............. 324/207.16 |
| 6,504,361 B1 | * | 1/2003 | Gleixner ................ 324/207.17 |

FOREIGN PATENT DOCUMENTS

| | | |
|---|---|---|
| DE | 39 13 861 | 11/1989 |
| DE | 41 13 745 | 10/1992 |
| DE | 197 57 689 | 7/1999 |

* cited by examiner

Primary Examiner—Gerard R. Strecker
(74) Attorney, Agent, or Firm—Ostrolenk, Faber, Gerb & Soffen, LLP

(57) ABSTRACT

An inductive measuring transducer having bodies movable relative to one another, one of the bodies being a sensor component including an inductive sensor that produces an alternating magnetic field. Another of the bodies is a pickup component including an inductive pickup into which the alternating magnetic field is injected. The pickup component includes a conductor loop in which the inductive sensor induces a voltage. A voltage curve independent of position of the sensor component relative to the pickup component develops over the conductor loop. Resistors have first ends connected along the coductor loop and second ends connected together in groups at connection points. Voltage can be picked off from the connection points that correspond to functions of the position of the sensor component relative to the pickup component and permit the position to be clearly determined, the position and value of the resistors defining the functions of the position.

17 Claims, 13 Drawing Sheets

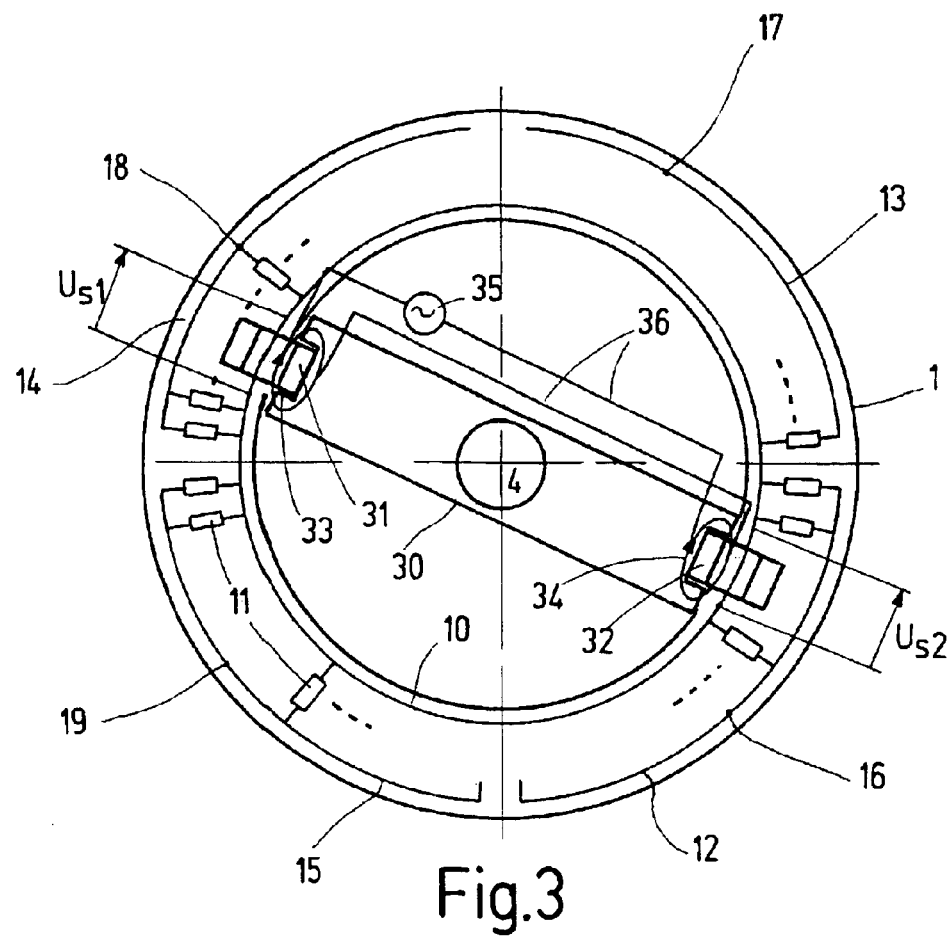
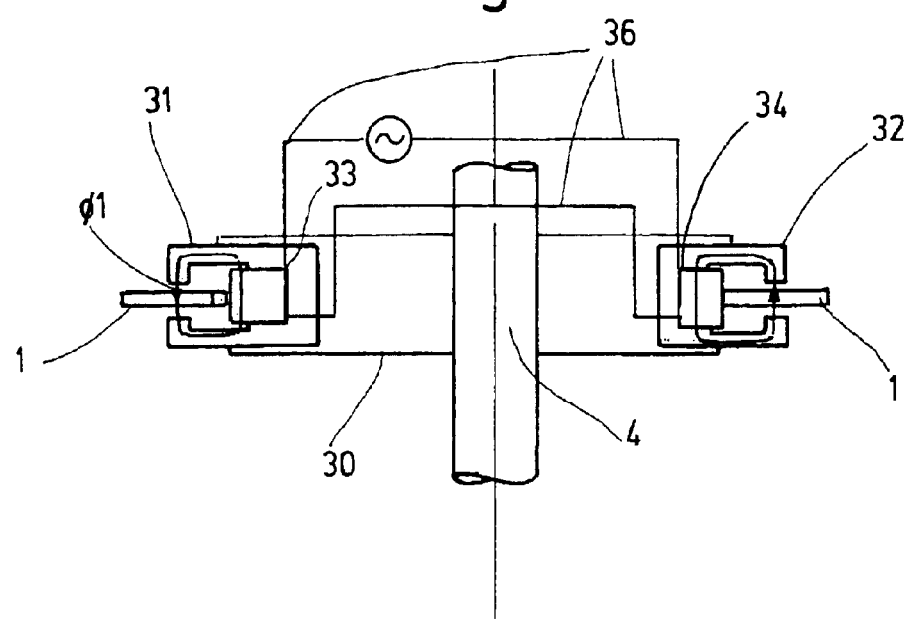
Fig.3
Fig.3a

INDUCTIVE MEASURING TRANSDUCER FOR DETERMINING THE RELATIVE POSITION OF A BODY

PRIORITY CLAIM

This is a U.S. national stage of application No. PCT/DE01/01557, filed on Apr. 24, 2001. Priority is claimed on that application and on the following application:
Country: Germany, Application No.: 100 22 082.7, Filed: May 8, 2000.

BACKGROUND OF THE INVENTION

The present invention relates to an inductive measuring transducer for determining the position of a body which is movable relative to another body, one of such bodies being equipped with at least one inductive sensor component that produces a local magnetic field and the other one of such bodies comprising an inductive pickup into which the local magnetic field is injected, and to an electronic circuit for supplying the inductive sensor component with an alternating voltage and a circuit for evaluating the output voltages of the sensor. It is the object of the invention to be described hereafter, to provide a measuring transducer which achieves a sufficiently high degree of precision at low expense.

Measuring transducers of that kind are used as measuring transducers preferably for measuring angles and displacements.

For converting an angular position of a rotor relative to a stator to an electric signal a large number of measuring methods have been known that can be implemented in the most different ways, depending on the particular application. With respect to insensitivity to environmental influences, the inductive measuring principle has been found to be especially well suited. Contrary to optical or capacitive methods, it is particularly insensitive to contamination and moisture condensation. Magnetic sensors may be influenced by external fields, or by aging or demagnetization of the permanent magnets employed. In addition, they are not very much suited for hollow-shaft sensors because normally the sensor has to be arranged at the center of rotation. Potentiometric angle sensors are connected with the disadvantage that the wipers and resistance layer are subject to wear.

Inductive angle sensors, such as resolvers or synchros, are known and have proven their value in practice. Because of their symmetric structure, the latter are relatively insensitive to eccentricity. On the other hand, however, only small gaps are possible between rotor and stator. Due to their structure, they are relatively expensive because precision-made and precision-wound stators and rotors lead to high production costs and material input.

DE 41 13 745 A1 describes a structure where a centrally arranged excitation coil magnetizes a pot-type ferrite core, fitted on the rotor shaft and comprising outer pot halves of different diameters, a circuit board with an induction loop being arranged between the outer pot halves, from which a voltage can be picked off by suitable pickoffs for obtaining the angle information. The disadvantage of that method mainly lies in the asymmetric structure of the rotor which has the result that any displacement of the center of rotation of the rotor results in a relatively important measuring error. Added to this, the method requires a core that covers the entire angular range. Especially when employed as a hollow-shaft sensor, a very large and expensive core is required. Contrary to optical systems, determining the effective center of such a system is quite difficult with such a system because of the nature and propagation of the magnetic field lines in such systems. In addition to the requirement of having the circuit board exactly positioned, a precise bearing system is also necessary.

In many applications it is possible either not at all, or only at high expense, for example by the use of additional bearings, to align the rotor exactly with the stator. In practice, eccentricities and axial displacements of more than ±1 mm may be encountered. In the case of asymmetric systems it is then necessary to work with large diameters, which frequently leads to considerable difficulties in use.

DE 197 57 689 A1 describes an inductive measuring transducer which uses a conductor loop and a resistor network to scan a movable alternating magnetic field and derive a position-dependent output voltage. While that system is well suited for measuring limited displacement and angular ranges, it can be adapted to a continuous measuring range of 360° only with considerable additional input.

SUMMARY OF THE INVENTION

Contrary to the known solution, the invention proposes to determine the measuring voltage by the steps of inducing a voltage, by one or more inductive sensor components mounted on a rotor, which cover only a small portion of a rotating conductor path, in a closed circular conductor loop extending along the path described by an inductive pickup element, and forming a function, defined by the position and value of different resistors, of the voltages encountered at the connection points of the different resistors and the conductor loop, by resistors distributed and connected along the periphery of the conductor path, the other ends of such resistors being connected one with the other in different groups. For example, a mean value of the voltage over an angular range can be obtained at a connection point if resistors with equal resistance values, arranged at equal spacings over that angular range, have their one ends connected to the conductor loop and their other ends connected to the connection point of the resistor group from which the voltage can be picked off. In order to permit the angle to be clearly determined over 360°, it is necessary to obtain at least two different voltage curve shapes, related to the angular position of the rotor. This is achieved by forming a plurality of resistor groups connected to different portions of the conductor loop.

When a single inductive sensor component is used, an alternating voltage is induced in the conductor loop over the angle filled by the air gap of the relatively small sensor component. That voltage produces in the conductor loop a current which, due to the inductive and ohmic resistance of the conductor loop, leads to a uniform voltage drop over the circumference. It can be shown here that by using resistor groups, each defining the mean value of a quadrant of the conductor path, a voltage curve shape as necessary for determining a clear angular value over a range of 360° is obtained.

If a single sensor component is used only, any displacement of the center of rotation of the rotor relative to the center of the stator in the direction of movement of the inductive sensor may, however, lead to measuring errors. Similarly, a not perfectly uniform behavior of the impedance of the conductor path over the circumference may cause additional measuring errors.

According to a further embodiment of the invention, this is avoided by using two inductive sensor components, offset by 180°, to induce voltages of opposed phase and equal amplitude in the conductor loop. The conductor loop then constitutes an electric circuit with two opposed voltage sources, where no differential voltage is present and, thus, no current flows between the voltage sources. Between the different sensor components, a conductor loop carries a voltage of constant amplitude, while the oppositely arranged portion of the conductor loop carries a voltage of opposed phase and equal amplitude. Due to the fact that there is no current flow in the conductor loop, no current drop produced by the impedance of the conductor loop will be encountered, either. Thus, the impedance of the conductor loop does not enter into the measuring result.

Any displacement of the center of rotation of the rotor relative to the stator in or against the direction of movement of the two oppositely arranged inductive sensors will result in opposed errors which largely balance each other out. It is, thus, possible to build up angle sensors especially for applications that do not have a bearing system of their own and/or where assembly tolerances are high.

A corresponding magnetic potential and, thus, a corresponding excitation current is required for generating the field in the air gap of the sensor component.

In principle, excitation by a winding connected directly to an oscillator would seem possible. In practice, this is however not practicable in most of the cases because of the movable lines required in this case and the limited angle of rotation.

In the case of a single core, excitation can be achieved by simple means. A core with high magnetic permeability, provided with an air gap, is used as an inductive sensor. The core encloses the turns of a concentric coil and the conductor loop for deriving the measured values. The core is designed in such a way that the main part of the magnetic flux produced by the excitation coil is caused to flow through the air gap of the core, with the result that an alternating current is induced in the conductor loop in the area of the core, which then induces in the conductor loop a voltage distribution depending on the position of the sensor relative to the pickup.

The stray flux of the excitation coil causes the measuring result to be weakened and leads to an additional measuring error. This effect can be greatly reduced by short-circuiting rings of low impedance which, while being efficiently inductively coupled to the excitation coil, omit the area of the core of the inductive sensor. A ring of that kind is to be regarded as short-circuited secondary winding of the primary coil. The current flowing in that ring is opposed to the primary current of the excitation coil and largely cancels out the field outside the core.

A current flowing in such a secondary winding may also serve to feed the one or more inductive sensors. It is, thus, no longer necessary for the core of the sensor to enclose the turns of the excitation coil. This permits an especially space-saving structure to be implemented because the secondary winding can be arranged at the least possible distance from the excitation coil. Such an arrangement makes it possible, in principle, to do without any soft magnetic cores although a reduced useful signal must be accepted in that latter case.

The useful signal can be increased in this case by improving the coupling between the excitation coil and the secondary winding by a soft magnetic core that encloses the excitation coil and the secondary winding so that the magnetic field lines of the excitation winding will flow predominantly through that core and the air gap formed by the latter.

In the case of oppositely arranged sensors, direct injection of the sensor voltage from the excitation coil into the measuring cores is possible either not at all or only with extreme difficulty because an opposed voltage is required. Each of the cores must be fed through a winding of its own. It is necessary for this purpose to provide an intermediate circuit on the rotor, as has been described before. This can be achieved by a secondary coil, coupled inductively to the concentric excitation coil, which is supplied with an alternating voltage and which has its terminals connected to the windings of the measuring cores in opposite winding directions, it being also possible to configure the coils as simple conductor loops.

The operating principle of an inductive measuring transducer with closed conductor loop can be used with advantage also for displacement measurements. The closed conductor loop is then configured approximately as a rectangle, to the long sides of which the resistors are connected in two or more groups. Different embodiments are possible in this respect. If a single core is used, two resistor groups are provided, which are connected on that long side of the measuring loop that extends in the measuring direction. The measured voltage then is the differential voltage between the two resistor groups. Between the sides of the measuring loop that extend crosswise to the measuring direction, a differential voltage is countered which is independent of the position of the inductive sensor and that corresponds to half the voltage induced by the inductive sensor. The latter can then be used as reference voltage for forming a ratio between position-dependent and position-independent voltage (ratiometric method), whereby the effect of factors that influence the output voltage, such as temperature, coil resistance, core geometry, can be largely eliminated.

Excitation of the inductive sensor may be effected by a coil wound directly onto the core of the sensor. This arrangement prevents any interfering stray flux that might influence the measuring result.

In many cases it is, however, not possible to wind the coil directly onto the core of the inductive sensor, for example because otherwise movable lines would be required which are very much prone to failure. Excitation of the inductive sensor can then be achieved by a coil that extends over the measuring length, with the core enclosing the turns and the conductor loop.

When the excitation coil is arranged directly below the measuring loop, then the stray flux encountered will be relatively strong. Ideally, this remains without effect, initially, although any faults in the resistance profile over the measuring loop make themselves felt more strongly. It is, therefore, advantageous to give the measuring loop a configuration where the induced voltages emanating from the excitation coil and the unavoidable stray flux balance out each other. This can be achieved by a design where the measuring loop extends in opposite directions, i.e. where the measuring loop consists of two line sections whose ends are connected by low-resistance lines in such a way that the beginning of each line section is connected to the end of the respective other line section. Another possibility consists in using a normal rectangular loop and dividing the coil into two partial coils arranged one beside the other and wound in opposite senses.

As in the case of angle-measuring systems a design using two cores, that induce opposed voltages in the conductor loop, is also possible. In this case, no current will flow in the conductor loop so that the resistance of the conductor loop will not enter into the measuring results.

An increase of the measuring range can be achieved also by an arrangement comprising two measuring cores associated to the two oppositely arranged line sections of the measuring loop. When the measuring core leaves the area of the conductor loop, the second measuring core will enter the oppositely arranged section of the measuring loop. It is, however, of advantage in this case to provide four resistor groups and to perform the evaluation in a manner similar to that of an angle sensor, with two characteristics displaced by 90°. The measuring length can be further extended by additional cores, in which case periodically repeating output signals will be obtained so that the output signal becomes ambiguous. Accordingly, additional measures, known as such, will be necessary in this case for determining the absolute position.

In the description that follows, the operating principles described above will be explained by way of examples.

BRIEF DESCRIPTION OF THE DRAWINGS

The Figures show:

FIG. 3: A diagrammatic representation of an inductive measuring transducer for angles comprising two oppositely arranged inductive sensors;

FIG. 3a: A section through FIG. 3;

DETAILED DESCRIPTION OF THE PREFERRED EMBODIMENTS

Figures 1, 1A:
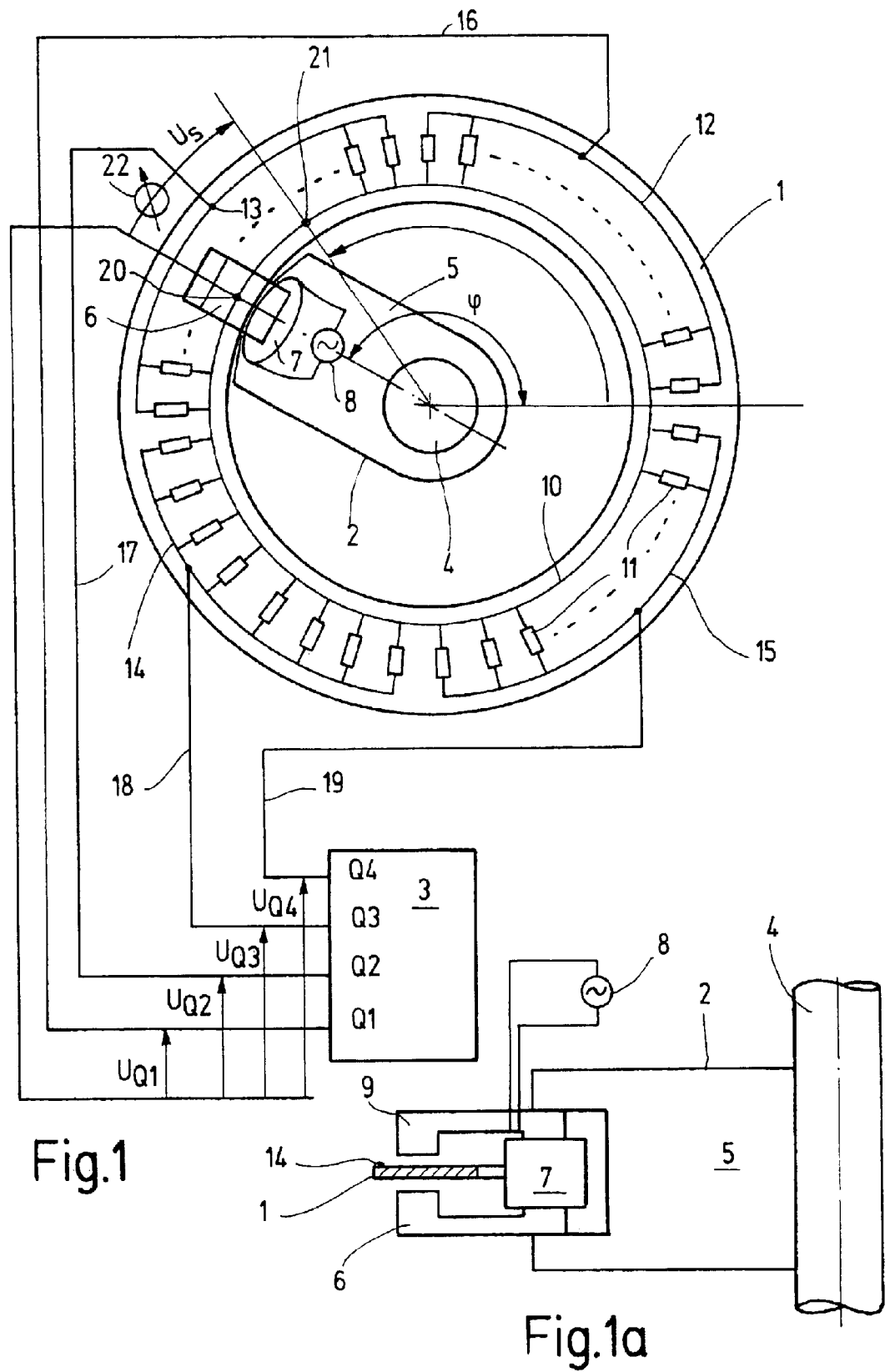
FIG. 1: A diagrammatic representation of an inductive measuring transducer for angles comprising an inductive sensor component.
FIG. 1a: A side view of the measuring transducer according to FIG. 1.

FIGS. 1 and 1a show a diagrammatic representation of an inductive angle sensor with an inductive sensor. It comprises an annular stator 1 in the form of a stationary annular printed circuit board and a rotor 2 mounted to rotate relative to the stator, and an electronic evaluation system 3. The center of rotation of the rotor 2 coincides with the center of the stator 1. An inductive sensor 6 in the form of a soft magnetic core 9, with a winding 7, is mounted on a shaft 4 of the rotor 2 by a mounting element 5 so that the stator board comes to lie in the air gap of the core 9. The winding 7 is conductively connected to an alternating voltage source.

The stator board 1 comprises a closed conductor loop 10 with resistors 11 connected to the latter at regular spacings. The resistors 11 are grouped to form four groups and are connected by their other ends to circular conductor paths 12, 13, 14 and 15, which in turn are connected to the electronic evaluation circuit 3 via connection lines 16, 17, 18 and 19, where the measuring signals that will be described hereafter are evaluated.

Figure 8:
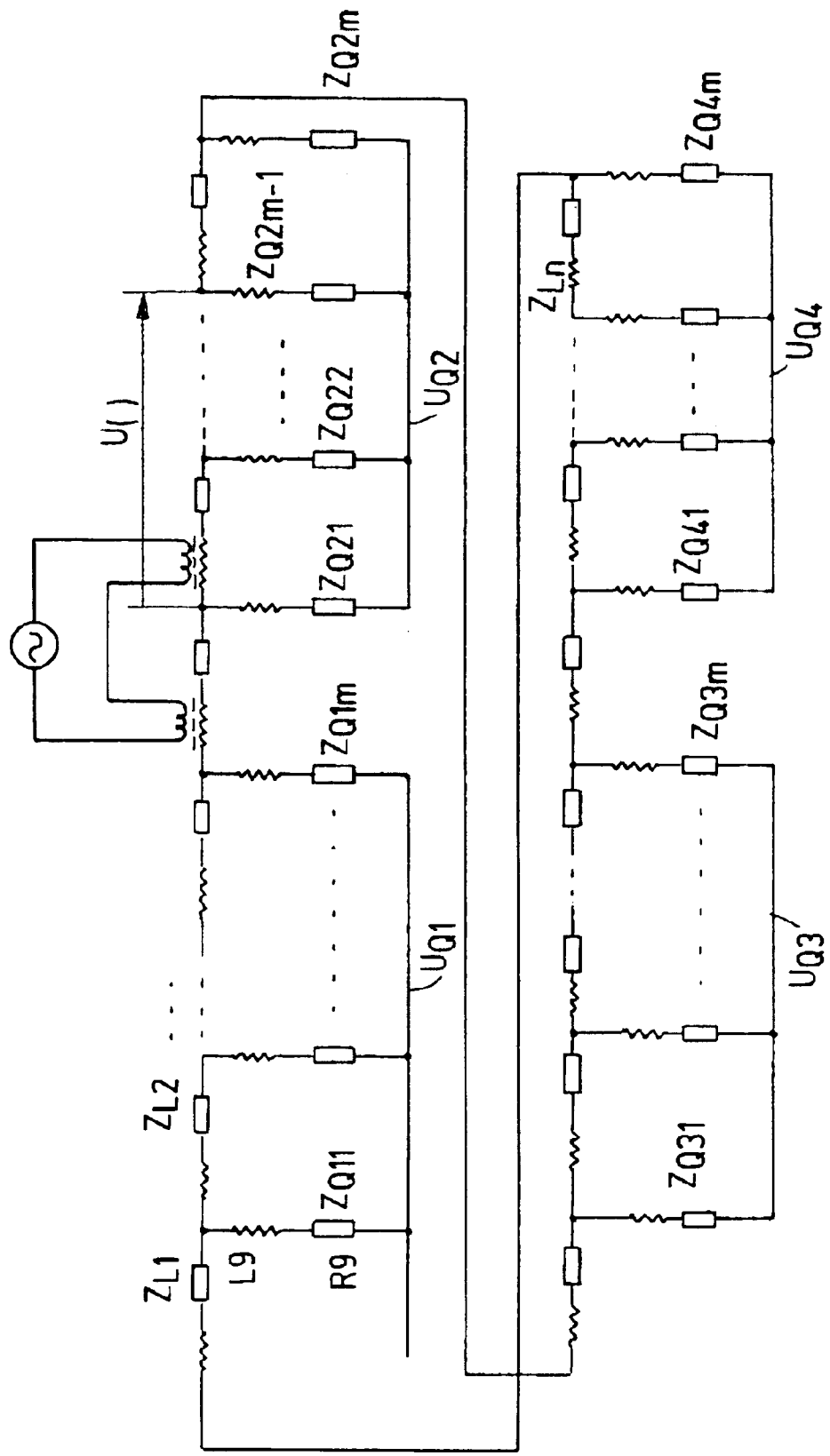
FIG. 8: An equivalent circuit diagram of the inductive measuring transducer for angles.

FIG. 8 shows an equivalent circuit diagram of the measuring sensor. The circular conductor loop 10 is represented by the complex, equally sized resistors ZL1 . . . ZLn (longitudinal impedance). These are series-connected so as to form a closed circuit. At the location of the inductive sensor, the inductive components act as transformers which have their primary sides connected to an alternating voltage source. The coupling state of those transformers varies as the position of the inductive sensor changes. The resistor network is represented by the complex, equally sized resistors ZQ11 . . . ZQ1$m$, ZQ21 . . . ZQ2$m$, ZQ31 . . . ZQ3$m$ and ZQ41 . . . ZQ4$m$ (quadrature-axis impedance). It can be assumed that the inductive component j$\omega$Lw of the network is negligibly small, compared with the resistance values R. Likewise, it can be assumed that the complex resistor ZL . . . is very small compared with the resistors ZQ . . . It is assumed that the number of resistors is large enough to achieve a sufficiently good approximation to a curve for an infinite number of resistors.

The development of the voltage U0 along the conductor loop at the connection points between longitudinal and quadrature-axis impedances can thus be easily seen. And the output voltages of the resistor network can thus be easily determined as well.

Figure 2:
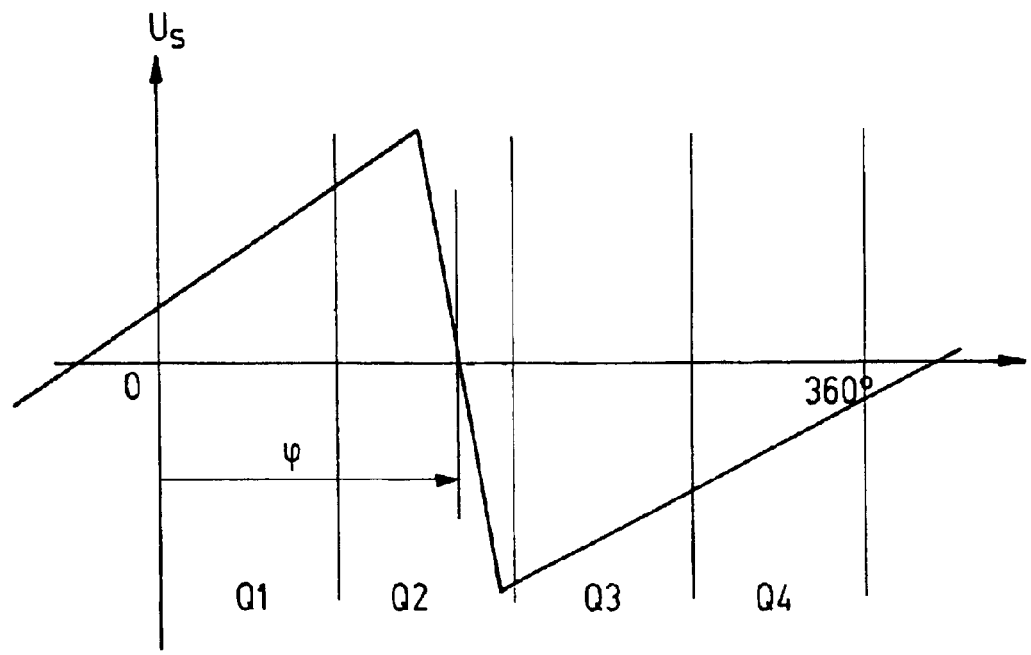
FIG. 2: A voltage curve shape at the conductor loop of the angle sensor according to FIG. 1.

FIG. 2 shows the idealized curve shape of the voltage Us along the conductor loop 10 for the angular position represented in FIG. 1. The voltage at the conductor loop 10 at the center of the measuring core 6 in FIG. 1 is taken as a reference point. Measuring is effected by means of a pickoff in radially outward direction along the resistors 11. Negative values represent voltages phase-shifted by 180°. The magnetic flux in the air gap causes a voltage to be built up in a conductor loop formed by the pickoff 20, the section of the conductor loop up to the second pickoff 21, the pickoff 21 and the measuring unit 22. Corresponding to the magnetic flux of the measuring core, the voltage rises steeply and drops later, outside the measuring core, linearly as a function of the angle between the measuring core and the pickoff. The voltage drop is caused by the impedance of the conductor loop, and it does not matter whether the voltage drop is caused by an ohmic or an inductive resistance. At the point of the printed circuit board opposite the measuring core, the voltage drops to 0, the phase is reversed, and the amplitude rises again to the maximum value on the other side of the core.

The voltages present at the connection points of Q1(12), Q2 (13), Q3 (14), Q4 (15) correspond to the mean value of the voltage present at the loop 11 in the area of the quadrants Q1 . . . Q4. When the rotor turns, the voltage curve shifts according to the angle φ. The output voltages of Q1. . . Q4 change correspondingly.

Figure 2A:
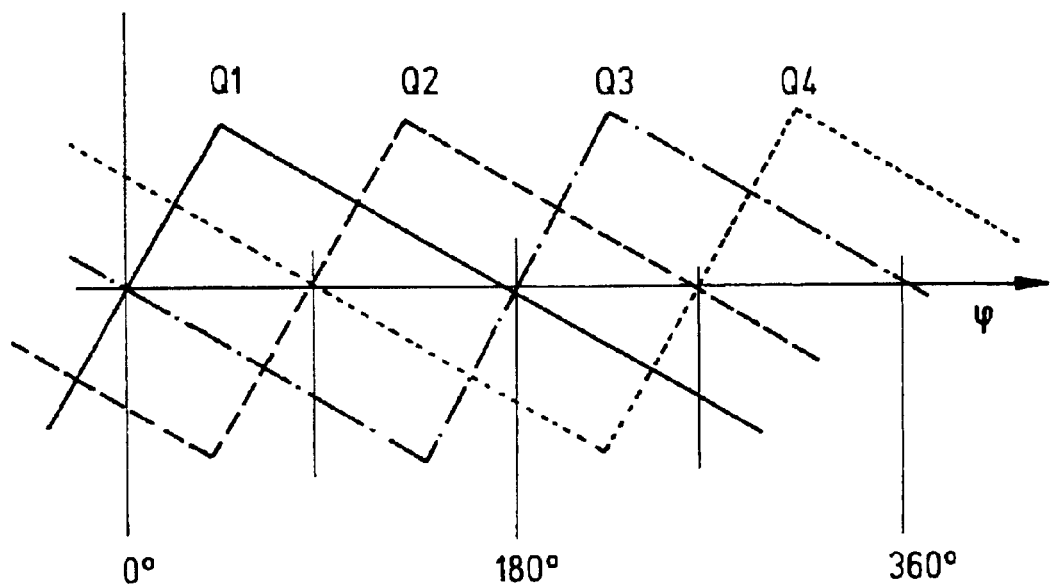
FIG. 2a: A voltage curve shape at the outputs of the resistor network, as a function of the angular position of the measuring transducer.
Figure 2B:
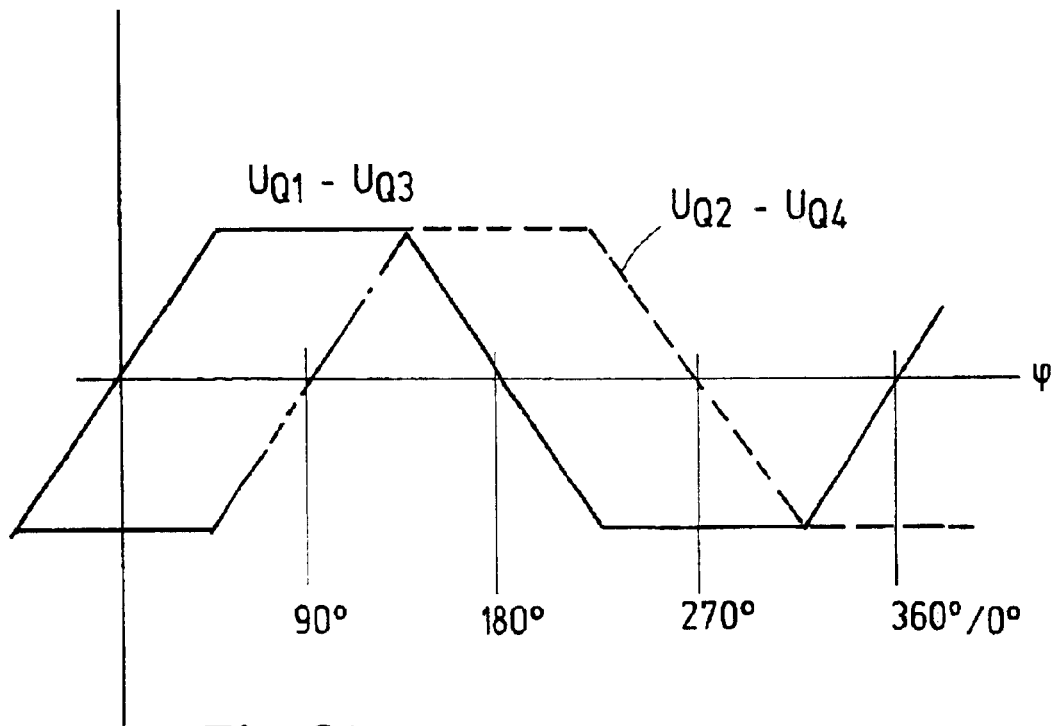
FIG. 2b: A curve of the differential voltages of the oppositely arranged resistor groups.

FIG. 2a illustrates the fundamental voltage curve shape at the outputs of the resistor networks 12 . . . 15. It is assumed that the resistors are distributed uniformly over the circumference. Roundings by marginal effects are neglected, and it is assumed that the width of the inductive sensor is negligibly small. The voltages UQ1 . . . UQ4 correspond to the mean value of the voltage according to FIG. 2 in that section of the conductor loop where the associated resistors are connected. The reference point being not accessible for voltage measurements, because it moves together with the sensor, only the differential voltage between oppositely arranged quadrants is picked off. By simply forming the difference between the voltage values UQ1–UQ3 and UQ2–UQ4, as shown in FIG. 2b, the voltages can be converted to two similar functions, only displaced by a rotor angle of 90°. These functions already permit the rotor position to be clearly determined. By forming the sum and difference of UQ1–UQ3+UQ2–UQ4 and UQ1–UQ3–UQ2+UQ4, respectively, one then obtains the curve according to FIG. 2c. This function provides the advantage that the sum of the amounts of the output voltages is constant. Accordingly, it can be used as reference for determining the angle value. Given the fact that the voltages rise or drop, respectively, linearly as a function of the angle, this allows the measuring angle to be easily determined with the aid of known methods. For determining a limited angle, the voltage alone will already suffice as measure of the angular position. By suitably sizing the resistor networks it is, in principle, also possible to plot other functions, such as sine-cosine functions, for which methods for determining the angle are likewise known.

The number of segments (Q1 . . . Q4) may be selected to be greater than that represented in the drawing. One then obtains a correspondingly greater number of turns, with a steeper characteristic, although these require a greater amount of input.

According to another possibility, two pairs of oppositely arranged resistor networks are provided over an angle of 180°, one pair being offset by 90° relative to the other pair. The differential voltage between the first pair then corresponds to the first curve shown in FIG. 2c, while the differential voltage between the second pair corresponds to the second curve. It is, however, a disadvantage of that solution that the resistor networks must have quite a number of resistors to obtain the same linearity of the output curve.

The different resistors maybe replaced by a resistance layer between the conductor loop and the connection lines of the different quadrants.

In the case of the structure described above, any lateral (radial) displacement of the center of rotation of the rotor relative to the center of the stator 1 in the direction of movement of the inductive sensor 6 will produce an error because the voltage curve along the conductor loop will be varied correspondingly. This may result in inadmissibly big errors, especially in applications where the angle sensor does not have a bearing system of its own, as is the case, for example, with hollow-shaft sensors. This situation can be remedied by an arrangement where two inductive sensors, offset by 180°, contribute approximately equally to the measuring result.

FIGS. 3 and 3a show a diagrammatic representation of the structure of an angle sensor comprising two inductive sensors offset by 180°. The structure of the stator 1 corresponds to that shown in FIG. 1. Accordingly, the designations have been taken over from that representation, to the extent identical to FIG. 1. In contrast to the latter, the rotor now comprises two inductive sensors 31 and 32, whose windings 33 and 34 are connected in series to the alternating voltage source 35 by the lines 36 in such a way that the alternating current flowing through them produces an opposed flux in the inductive sensors. This gives rise to opposed voltages in the closed conductor loop 10 over the width of the inductive sensors. As a result, the voltages balance out each other over the circumference so that no current will flow through the conductor loop, if one neglects the current flowing through the resistor network, and a voltage drop between the two inductive sensors 31 and 32 does not occur, either. The inductive or ohmic resistance of the conductor loop thus has no influence on the voltage curve over the circumference so long as it remains negligibly small relative to the network resistance, which can be ensured without any difficulty.

Figure 4:
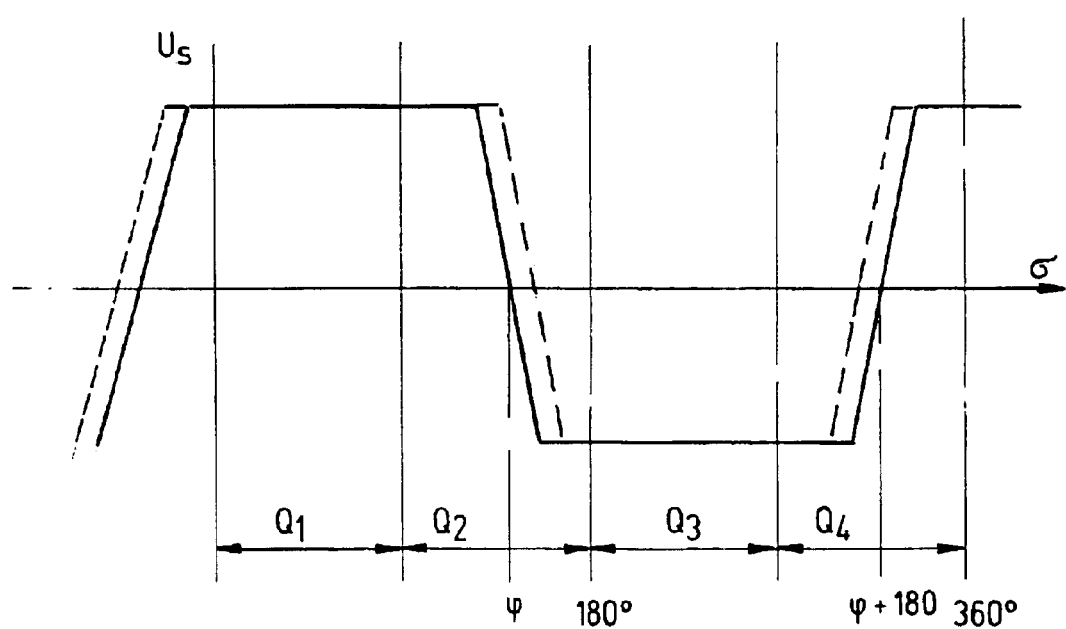
FIG. 4: A voltage curve shape at the conductor loop, in the case of two sensors.

FIG. 4 shows a diagram of the voltage curve over the circumference of the conductor loop 10 for the angle sensor comprising two inductive sensors, corresponding to FIG. 2 for an angle sensor with one inductive sensor. In this case, the value of the voltage Us along the loop 10 remains constant up to the beginning of the sensor 31, then turns to the opposed phase value (represented as negative value) over the width of the sensor, then remains constant again up to the beginning of the second sensor, where it once more turns to the equal-phase voltage over the latter's width.

Figure 2C:
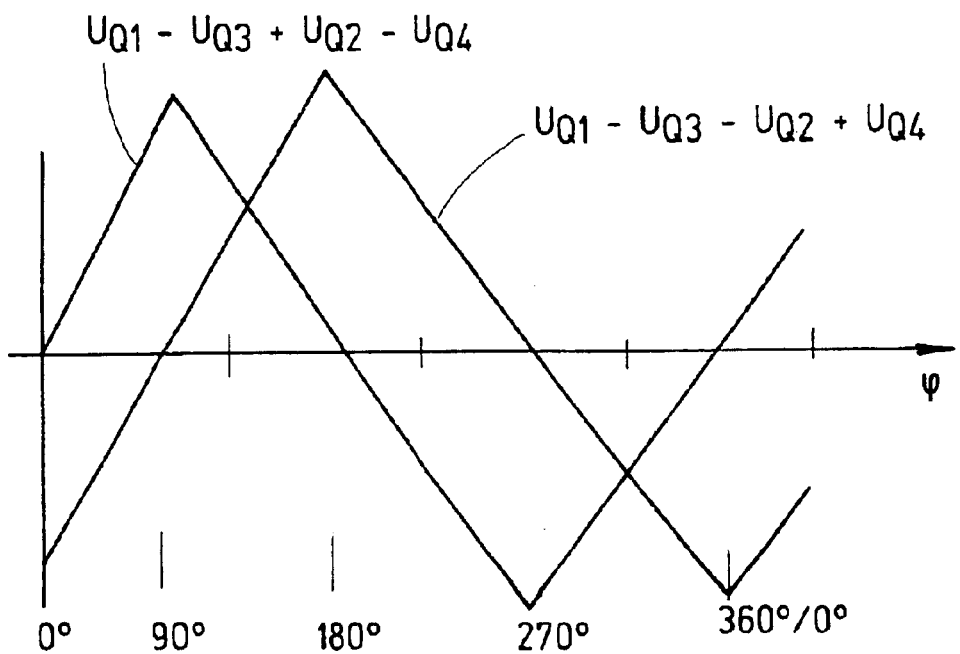
FIG. 2c: A curve of the sum and difference of the voltages.

This leads to an output voltage of the resistor networks as illustrated in FIG. 2b or, if the values are added up correspondingly, as shown in FIG. 2c.

Any displacement of the center of rotation of the rotor in a direction transverse to the direction of movement of the sensor element causes the voltage distribution in the conductor loop 10 to vary. The broken line in FIG. 4 shows the development of the voltage along the measuring loop when the center of rotation of the rotor is displaced from the center of the stator. In the present case, only the output voltages of the ranges between 90° and 180° and between 270° and 360° (0°) contribute to the measuring result. These output voltages are formed by the integral of the loop voltage over the respective range, with the second range taken as negative value. It can be seen easily that the deviations of the characteristic largely balance out each other in the integral over the characteristic across the two quadrants relevant for the result.

Figure 5:
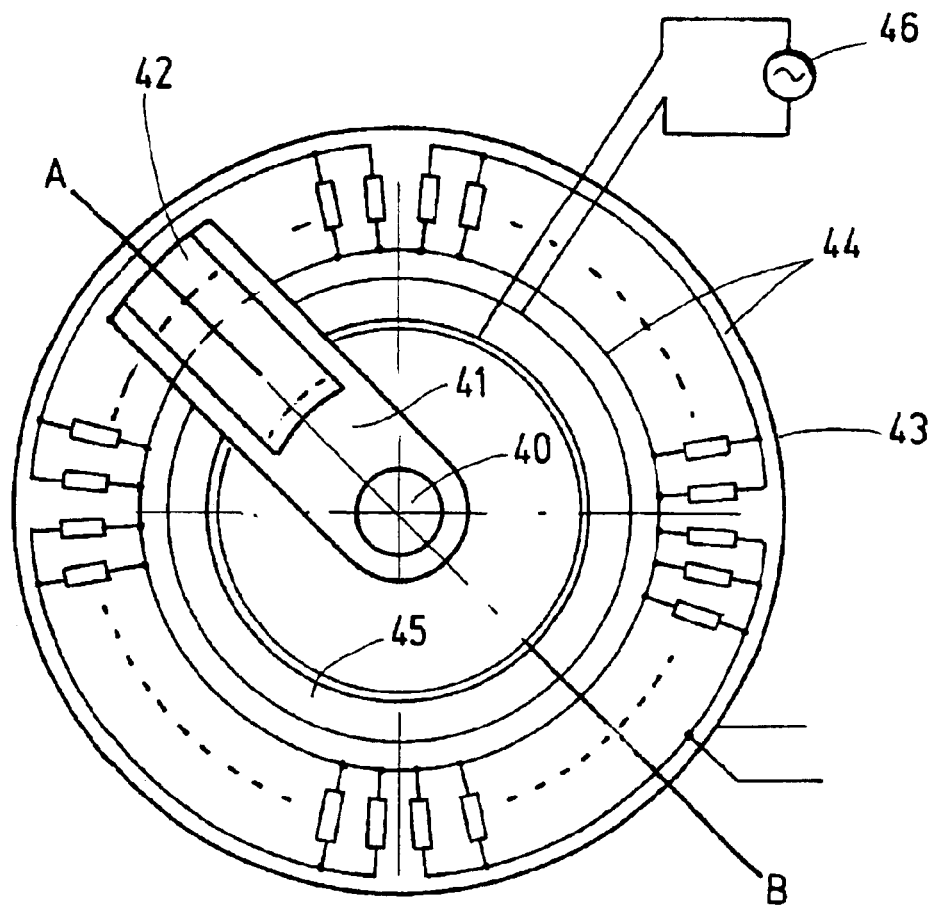
FIG. 5: A diagram of the structure of an inductive measuring transducer for angles, with a measuring head and excitation by concentric coil.
Figure 5A:
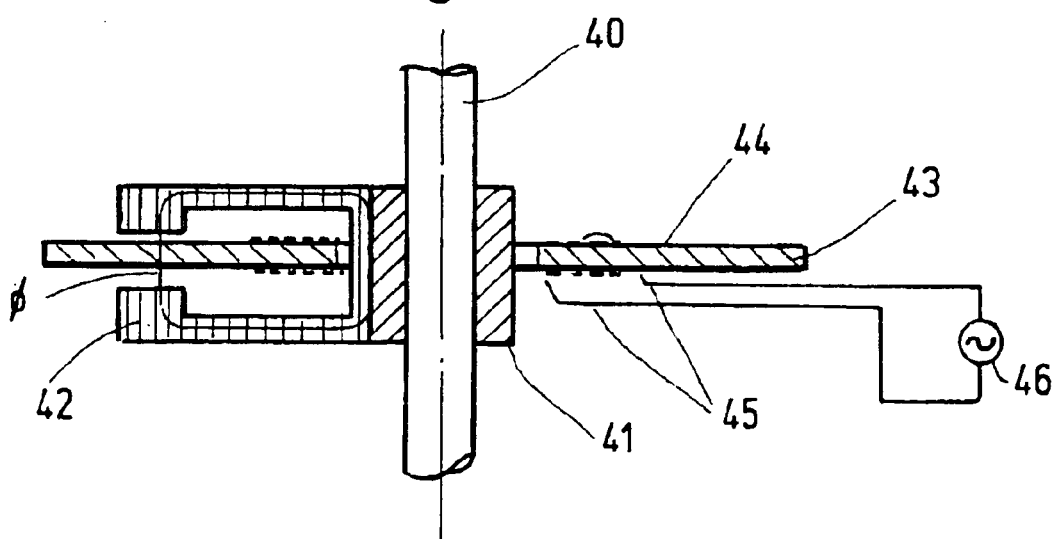
FIG. 5a: A section through FIG. 5 along the line A–B.

The supply of the inductive sensor element is not described in detail in FIG. 1. Normally, it is not possible to connect the sensor element directly to an alternating current source because the use of connecting lines is unreliable or generally impossible in applications using a continuous shaft. It is, therefore, necessary to have the excitation power transferred to the rotor in a no-contact way. In one embodiment using an inductive sensor element according to FIG. 1, this can be achieved by a concentric coil whose turns are enclosed by the core of the inductive sensor element. This has the effect that the magnetic flux produced by the coil is directed into the measuring loop in the area of the air gap of the core. FIGS. 5 and 5a show a corresponding structure of the kind built up with advantage according to the rules of printed-circuit engineering. The shaft 40 carries, on a support 41, a soft magnetic core 42. The core is designed in such a way that it encloses the coil 45 attached to the stator 43, the magnetic flux ϕ produced by the coil permeating predominantly the measuring coil 44. A voltage source 46 is also provided.

A stray flux outside the core cannot be fully avoided in such an arrangement. However, contrary to other measuring methods, this in principle only has the result to reduce the useful signal. The stray flux is equally effective over the circumference, except for the area of the measuring core. The voltage generated by the stray flux is balanced out by the voltage drop at the conductor loop. Basically, however, the stray flux has the result to increase the measuring error because the influences of linearity errors are increased in the measuring loop. When the excitation coil is directly coupled to the measuring loop, then the excitation coil must be located relatively close to the measuring loop because otherwise a very large core would be required, which in turn would produce an important stray field.

It is, therefore, advantageous, especially for embodiments the construction of which requires that the excitation coil and the measuring loop be positioned close to each other, to eliminate the influence of the stray flux to the greatest possible degree. This can be achieved by giving the measuring core a suitable structure or by short-circuiting rings. In most of the cases, the configuration of the core is subject to constraints resuling from the nature of the material used. The ferrites usually employed are rather brittle and set limits to the shaping possibilities.

An especially effective solution is obtained by a short-circuiting loop, which is mounted on the rotor and which covers the excitation coil, but is guided around the measuring core in such a way that the current flowing in it does not contribute toward magnetizing the measuring core. The current flowing in the loop generates a magnetic field of its own, which largely balances out the primary field, so that, practically, the measuring loop is magnetized only the field of the measuring core.

Figure 6:
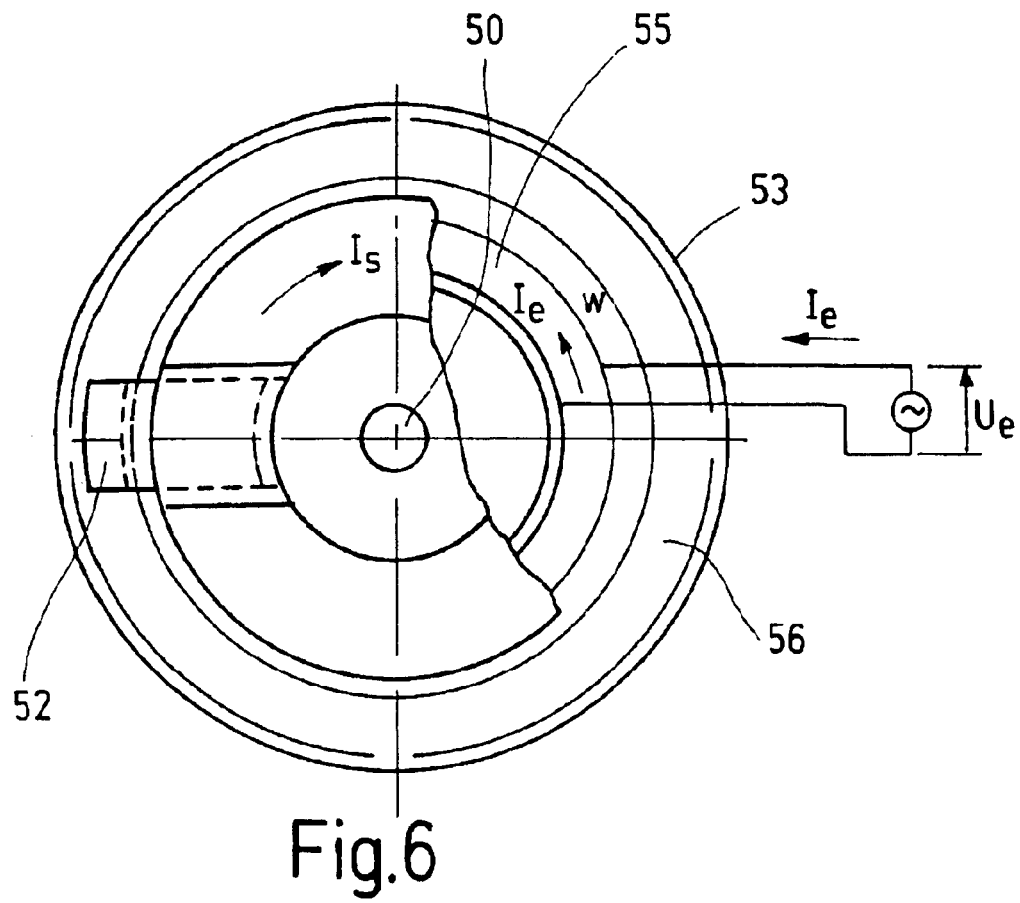
FIG. 6: A diagram of the structure of an inductive measuring transducer for angles, with an inductive sensor, excitation by a concentric coil and a screen ring that acts to suppress the stray field.
Figure 6A:
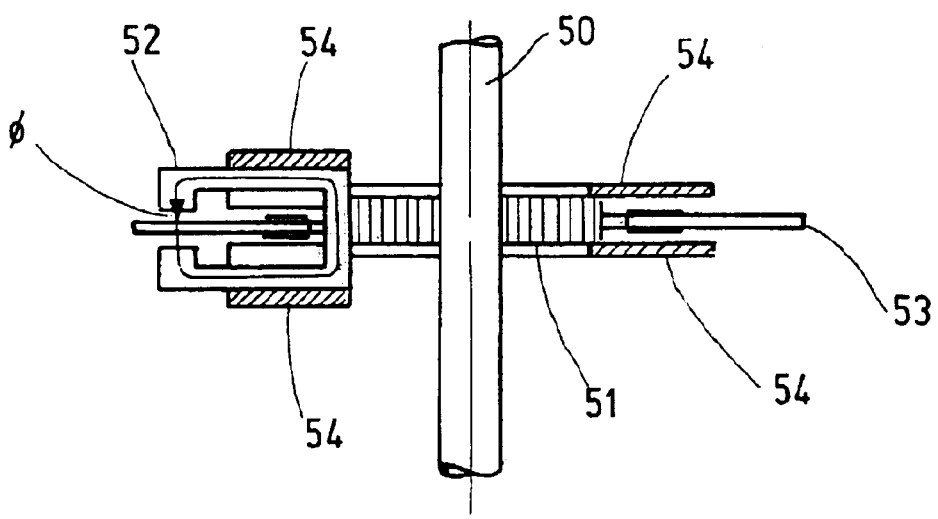
FIG. 6a: A section through FIG. 6.

FIGS. 6 and 6a show a diagrammatic representation of an angle sensor with an inductive sensor element 52 and a concentric sensor coil 55, where the stray flux is suppressed by a short-circuiting ring. The measuring core 52 and the short-circuiting ring 54, consisting of a material of high electric conductivity, is mounted on the shaft 50 with the aid of the support 51. The ring encloses the stator 53 which carries the excitation coil 55 and the measuring loop 56 in the form of a printed circuit board. The current le flowing through the coil 55 generates a magnetic field, which largely extends over the area of the measuring loop 56, but which also encloses the short-circuiting rings 54. The latter constitute, for the excitation winding, a well-coupled secondary winding of low impedance. As a result, the secondary current Is flowing via the rings gets close to the primary excitation $I_eEw$ (excitation current multiplied by the number of turns). The resulting magnetic field largely balances out the primary field outside the short-circuiting rings. The magnetic flux required for generating the mutual induction for the supply voltage is, therefore, predominantly generated by the flux that flows through the measuring loop via the measuring core.

In principle, it is also possible to use the secondary current as supply for the inductive sensor element. The measuring core can then be designed to enclose the measuring loop. This makes the measuring core considerably smaller. There is even the possibility to do entirely without a core and to have the field generated by a conductor loop (sensor loop) which is passed by the secondary current. However, the secondary current is no longer a pure short-circuited turn in this case. It must deliver a voltage at the winding of the measuring core, or at a sensor loop, in order to permit a voltage to be induced in the measuring loop.

This method seems to be particularly advantageous when two measuring cores are used. When two sensors offset by 180° are used, as shown in FIG. 2, then the inductive sensors (measuring cores or sensor loops) must be magnetized in opposed senses to obtain the desired voltage distribution along the measuring loop. While direct coupling of one or more excitation coils is, in principle, possible it leads to extremely awkward constructions that require much space.

Figure 7:
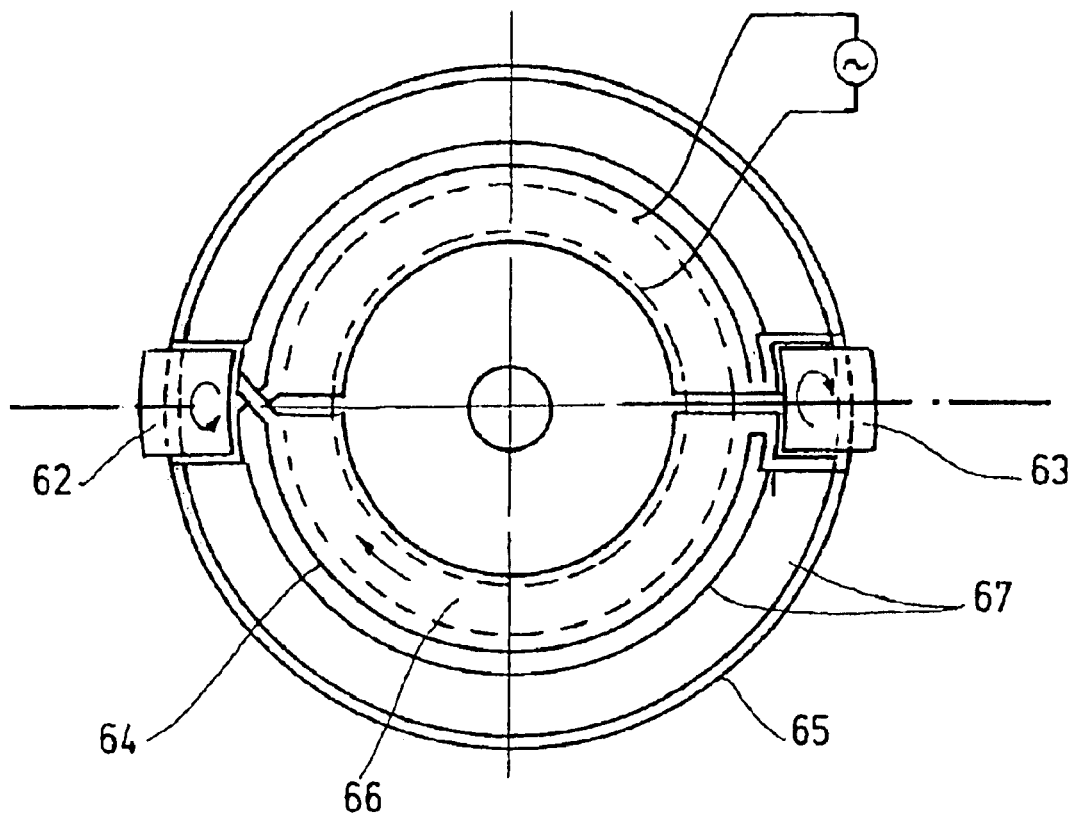
FIG. 7: A diagram of the structure of an inductive measuring transducer for angles, with two measuring heads and excitation by a concentric coil and an intermediate circuit.
Figure 7A:
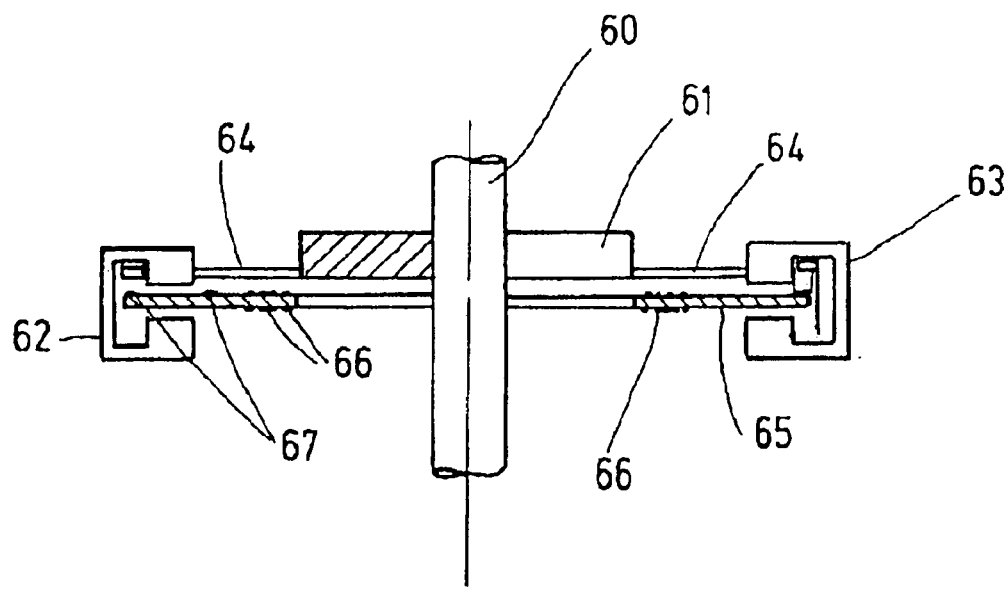
FIG. 7a: A section through FIG. 7.

A simple and space-saving structure can be achieved with the aid of a secondary circuit. FIGS. 7 and 7a show a diagrammatic representation of an angle sensor with two inductive sensor elements offset by 180°, which are supplied by a secondary circuit. Mounted on the shaft 60, via the support 61, are two similar cores 62 and 63 made from a material of high magnetic permeability, and a loop 64 made from a material of high electric conductivity. The loop, which is passed through the core 62 in counter-clockwise direction and through the core 63 in clockwise direction, otherwise follows the excitation coil 66 on the stator 65. The stator 65 is arranged in such a way, relative to the rotor, that the measuring loop 67 located thereon lies in the air gap of the cores 62 and 63, while the conductor loop 64 extends at a small spacing from the excitation coil 66. The excitation coil 66 is supplied from an alternating current source. The magnetic field produced by the coil 66 largely encloses the loop 64 and induces in it a corresponding alternating voltage. The current resulting therefrom flows around the core 62 in clockwise direction, whereas a current flowing in counter-clockwise direction is encountered in the opposite core 63. Provided the two cores have the same magnetic properties, the magnetic fluxes of the two cores are equal in magnitude, but opposed in direction. The properties of the angle sensor described with reference to FIGS. 3 and 4 are, thus, established. A voltage builds up above the measuring loop that remains constant between the cores. Measuring errors, that may result from the influence of the center of rotation of the rotor being displaced from the center, will be heavily reduced.

It is a disadvantage of methods working with an intermediate circuit that the useful signal present at the outputs of the pickup is reduced because of the stray flux of the excitation coil. In addition, injection of the stray flux into the measuring loop is undesirable because it may lead to measuring errors. This situation can be remedied by improving the inductive coupling by a soft magnetic core.

Figure 9:
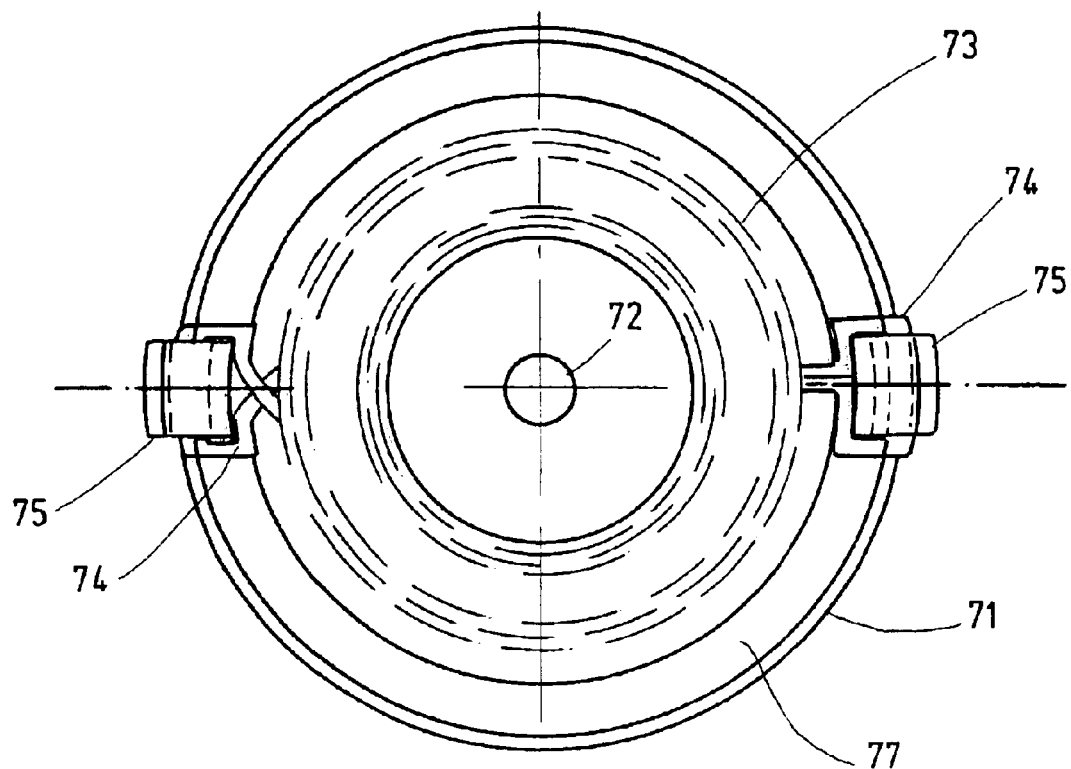
FIG. 9: A diagram of the structure of an inductive measuring transducer for angles, with two measuring heads and excitation by a concentric coil and an intermediate circuit with a soft magnetic core for increasing the induced voltage between excitation winding and intermediate circuit.
Figure 9A:
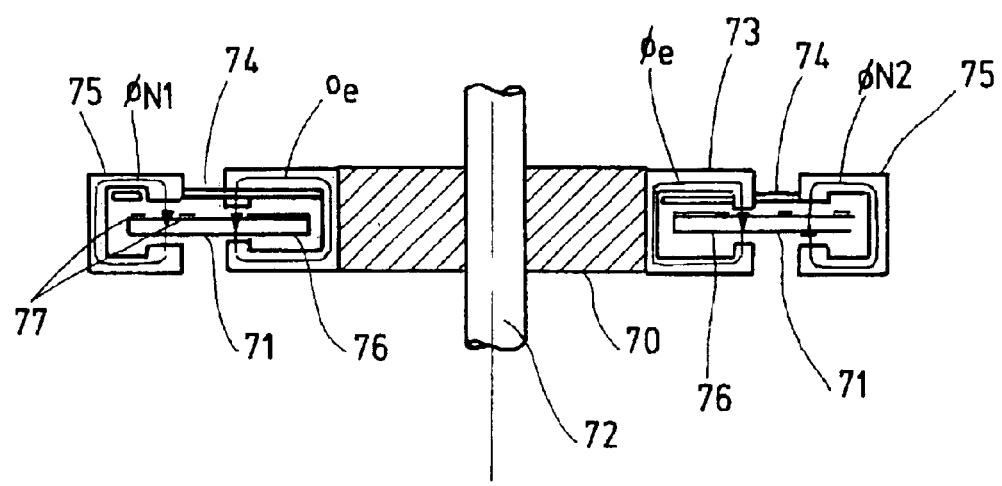
FIG. 9a: A section through FIG. 9.

FIGS. 9 and 9a show a diagrammatic representation of a structure of an inductive measuring transducer for angles with two sensor elements and supply from a concentric coil, and an intermediate circuit with a soft magnetic core for improving inductive coupling between the excitation winding and the intermediate circuit. The structure corresponds to that of the measuring transducer illustrated in FIG. 7. The stator 71 comprises a circuit board carrying an excitation coil 76 and an inductive pickup 77. The rotor 70 is mounted on the shaft 72 and comprises essentially a mechanical connection element, an annular soft magnetic core 73, a secondary loop 74 made of a material with good electric conductivity, and two soft magnetic cores 75 wrapped by the secondary loop in opposed directions. The design of the core 73 is such that it encloses the turns of the excitation coil together with that part of the secondary loop 74 or of the intermediate circuit of the coupling coil, that extends in parallel to the winding of the excitation coil. Given the fact that the core consists of a material of high magnetic relative permeability (20 . . . 1000, depending on the particular material), the magnetic resistance of the circuit formed by the core and the air gap is small, compared with the magnetic resistance of the circuit formed by the air path. The excitation coil 76, provided on the stator in the form of a printed circuit, is passed by an alternating current and generates, accordingly, a magnetic flux φe which, due to the low magnetic resistance of the magnetic core and the air gap, flows predominantly through the soft magnetic core. A corresponding magnetic flux is required to produce the necessary counter-EMF to the supply voltage.

Figure 10:
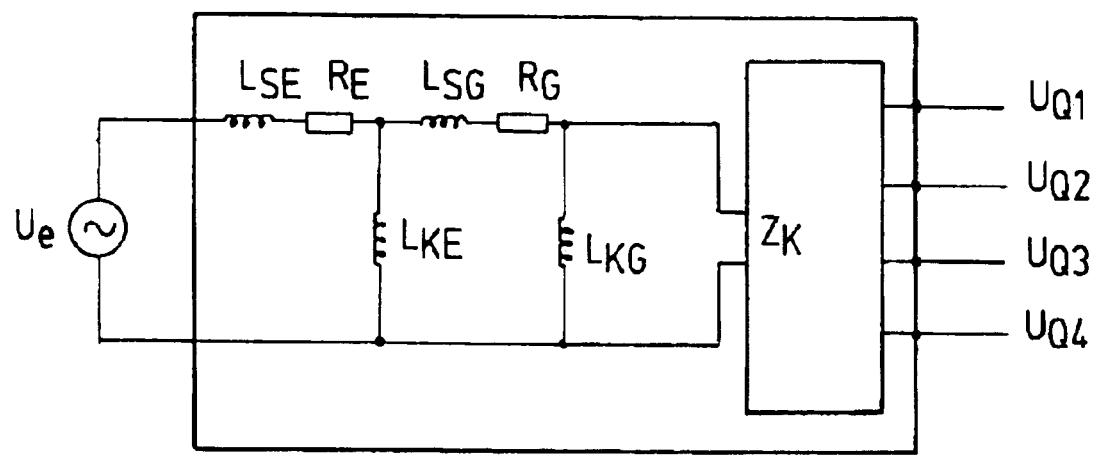
FIG. 10: An equivalent circuit diagram of the inductive measuring transducer with intermediate circuit.

FIG. 10 shows an equivalent circuit diagram of the measuring transducer, comprising only a single sensor Zk, for the sake of simplicity. A transformer, formed by the excitation coil and the secondary loop, is shown in standardized fashion in the drawing. The secondary voltages and currents must be calculated based on the turns ratios. Loading on the circuit by the pickup is highly resistive, so that it can be neglected. An alternating current source Ue supplies the excitation coil of the measuring transducer which is represented by the following components: LSE—leakage inductance, RE—ohmic resistance of the excitation coil, LKE—coupling inductance between the excitation coil and the secondary loop. The supply voltage for the sensor, designated by LKG, is picked off from LKE, whereby a current drop occurs as a result of the leakage inductance of the secondary circuit LSG and the ohmic resistance RG.

A soft magnetic core (FIG. 9–73) has the effect to increase the inductance LKE (FIG. 10), thereby reducing the effects of the leakage inductance LSE and of the resistance of the excitation coil on magnitude and phase of the output voltages.

Figure 11:
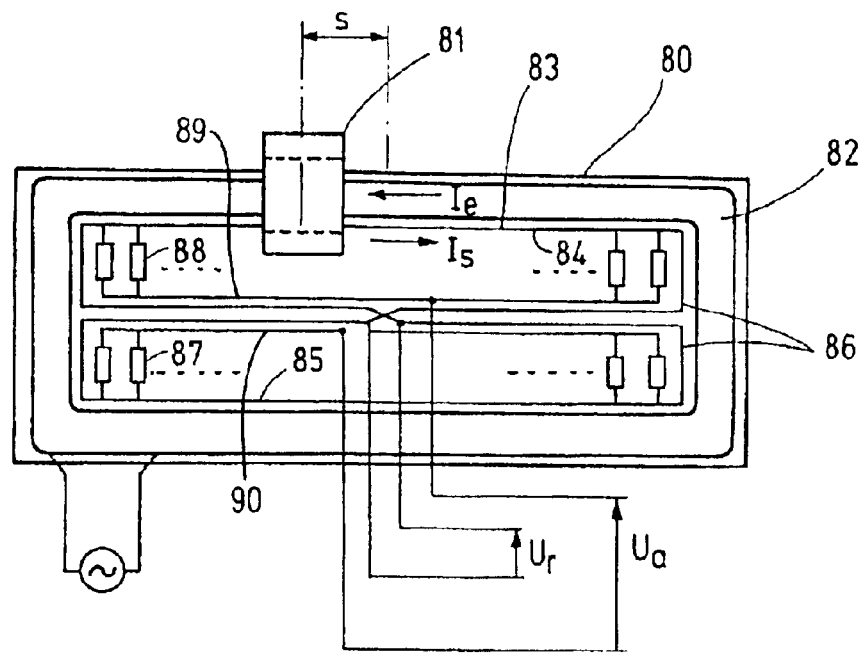
FIG. 11: One embodiment of an inductive measuring transducer for displacements.

FIG. 11 shows one embodiment of an inductive measuring transducer for displacements.

A rectangular sensor board 80 carries an excitation coil 82 which is supplied with alternating current. A conductor loop 83 is arranged inside the coil. The conductor loop consists of sections 84 and 85 and the connection lines 86. The sections 84 and 85 are highly resistive compared with the connection lines 86 that cross one another in the middle. Resistors 88 are connected to the section 84, resistors 87 to the section 85. The resistors have their other ends connected to the connection lines 89 and 90, respectively. The measuring voltage Ua is picked off from the connections, while the reference voltage Ur is picked off between the connection lines.

The coil 82 is supplied with an alternating voltage so that it produces an alternating magnetic field. In the absence of the core 81, the entire flux through the measuring coil 83 is equal to zero. The circulating current Is, derived from the resistors 88 and 87, is insignificant because a differential voltage exists along the sections 84 and 85. The differential voltage Ua remains equal to zero.

Figure 12:
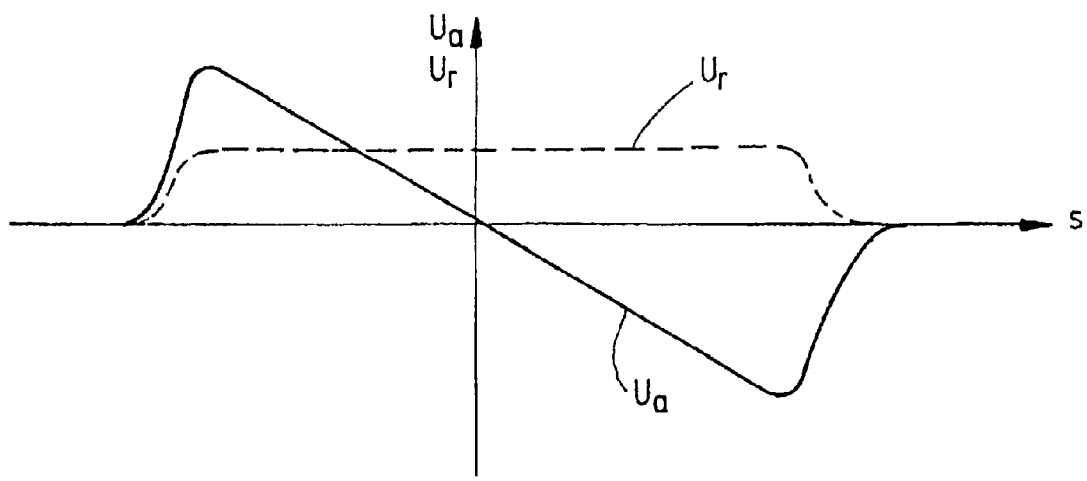
FIG. 12 A curve shape of the output voltage over the displacement, for a displacement sensor according to FIG. 11.

When the core 81 is introduced, the effective flux through the measuring loop is determined by the core 81 and the flux through the excitation coil 82. Accordingly, a voltage is induced that generates a current Is through the measuring loop 83. The induced voltage and the voltage drop at the resistor of the conductor loop 83, caused by the current Is, result in a voltage curve similar to that illustrated in FIG. 2. By deriving the differential voltage between the connections of the resistor groups 87 and 88, a position-dependent output voltage Ua is obtained at the connections 89 and 90, as shown in FIG. 12. When the core enters the area of the conductor loop, the voltage Ua rises until the pole faces the core 81 are fully enclosed by the conductor loop 84. While the voltage Ur remains constant, the measuring voltage Ua drops linearly as a function of the distance s, crossing zero in the middle. The further voltage curve is then symmetrical, the 180° phase-shifted voltage being represented as being negative.

There is further another possible embodiment having two inductive sensors that induce two voltages of approximately equal amplitude, but opposed phase, so that no current flows through the conductor loop and the voltage curve along the conductor loop is equal to that shown in FIG. 4.

Figure 13:
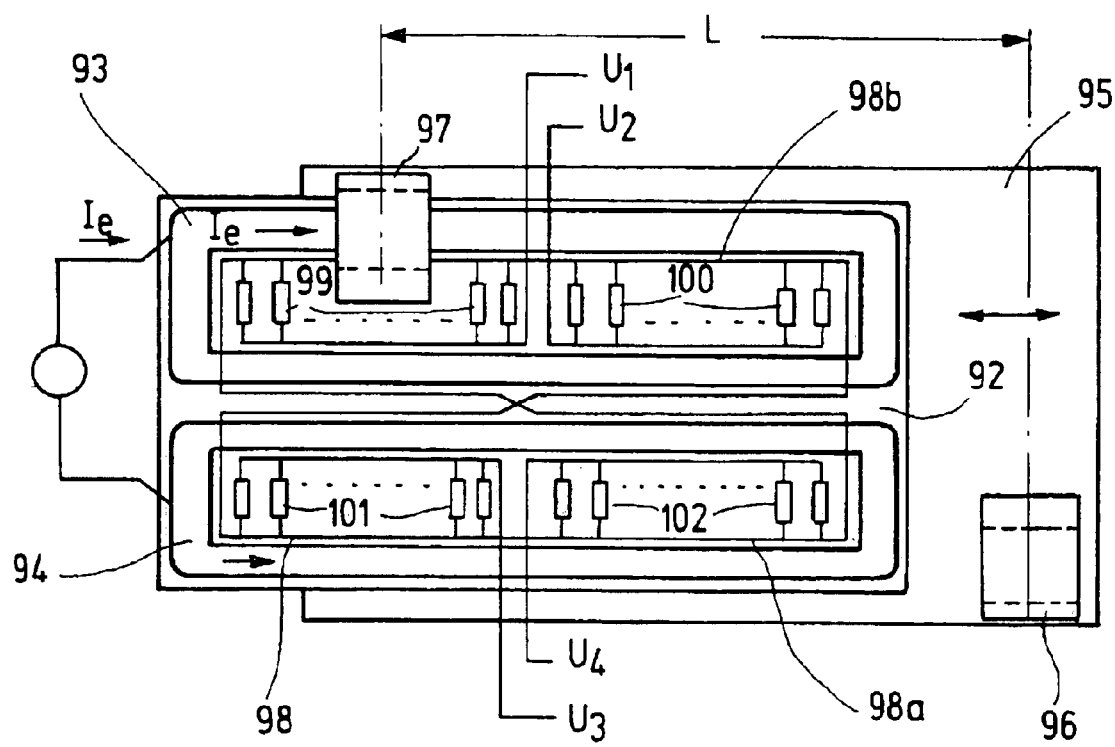
FIG. 13: One embodiment of an inductive measuring transducer for displacements, with extended measuring range.

FIG. 13 shows a diagrammatic representation of the measuring transducer with extended measuring distance. Mounted on the printed circuit board 92 are two series-connected coils 93 and 94, which are connected in series in such a way that they produce alternating magnetic fields. In addition, a conductor loop 98 is provided which has a structure similar to the conductor loop illustrated in FIG. 11. Connected to that conductor loop are four resistor groups 99.102, which are brought out to the connections for acquisition of the voltages U1, U2, U3 and U3. Two soft magnetic cores 96 and 97 are fastened on a carrier 95, which is movable in the measuring direction, at a spacing L corresponding to the extension of the conductor loop 98 in the measuring direction. When the carrier 95 is displaced in the envisaged measuring range, only one of the two cores 96 and 97 will be in the range of the conductor loop 98, except in the transition range, in the middle of the measuring range, where one core will enter the conductor loop as the latter is being left by the other core. The cores produce in the conductor loop 98 a voltage profile similar to that illustrated in FIG. 2, the length of one section (98a, 98b) corresponding to an angle of 180°. It is, thus, possible, to pick off from the connections the voltages U1 . . . U4 that correspond to the curve illustrated in FIGS. 2a. . . 2c. It is thereby possible to determine the absolute position along a displacement range of twice the extension of the conductor loop, reduced by the width of the core. By adding further cores, the measuring range can be increased at desire, in which case a periodic output signal will be obtained. However, the measured value becomes ambiguous in this case. For determining the absolute value, the use of further known devices such as limit switches and cycle counters, will be additionally required.

What is claimed is:

1. An inductive measuring transducer comprising: bodies that are movable relative to one another, one of the bodies being a sensor component including at least one inductive sensor that produces an alternating magnetic field, and another of the bodies being a pickup component including at least one inductive pickup into which the alternating magnetic field of the inductive sensor is injected; an electronic circuit arranged so as to supply the inductive sensor with an alternating current; a circuit operative to evaluate output voltages of the measuring transducer, the pickup component including a closed conductor loop in which the at least one inductive sensor of the sensor component induces a voltage so that a voltage curve independent of a position of the sensor component relative to the pickup component develops over the conductor loop; and resistors having first ends connected along the conductor loop and second ends connected together in groups at connection points so that voltages can be picked off from the connection points of the resistor groups that correspond to functions of the position of the sensor component relative to the pickup component and permit the position to be clearly determined, the position and value of the resistors defining the functions of the position.

2. The inductive measuring transducer as defined in claim 1, wherein the circuit is operative to derive measuring voltages from a difference between the voltages present at the connection points between every two resistor groups.

3. The inductive measuring transducer as defined in claim 1, wherein the sensor component is rotatable relative to the pickup component, the at least one inductive sensor describes a substantially circular path relative to the pickup component, and the closed conductor loop is substantially circular in a measuring range, for determining an angle between the pickup component and the sensor component.

4. The inductive measuring transducer as defined in claim 3, wherein the conductor loop substantially forms a circle and the resistors are connected together at their second ends at connection points over a predeterminable angular range, whereby voltages can be picked off from the connection points for determining the angle.

5. The inductive measuring transducer as defined in claim 4, wherein the predeterminable angular range is about 90°.

6. The inductive measuring transducer as defined in claim 1, wherein resistor networks are formed by resistance layers.

7. The inductive measuring transducer as defined in claim 1, wherein the inductive sensor of the sensor component consists of a core made from a material of high magnetic permeability, the core comprising an air gap through which the closed conductor loop of the pickup component is guided and the pickup component comprising a coil which is supplied with an alternating current and has turns enclosed by the core.

8. The inductive measuring transducer as defined in claim 7, wherein the sensor component comprises at least one closed conductor loop of low impedance, which provides efficient inductive coupling to the coil and which is guided in an area of the core so that current flowing in the closed conductor loop of low impedance results in substantially no magnetic flux in the core.

9. The inductive measuring transducer as defined in claim 1, wherein the pickup component comprises a coil supplied with an alternating voltage, and wherein the sensor component comprises at least one coupling coil coupled inductively to the coil which is electrically connected to the at least one coil of the at least one inductive sensor so that current flowing in the coupling coil generates the alternating magnetic field of the at least one inductive sensor.

10. The inductive measuring transducer as defined in claim 3, wherein the sensor component comprises two inductive sensors offset by 180°, each of the inductive sensors being operative to generate an alternating magnetic field that permeates the inductive pickup at approximately equal amplitude but in opposed direction.

11. The inductive transducer as defined in claim 10, wherein the sensor component has a winding that consists of a single conductor loop.

12. The inductive transducer as defined in claim 9, wherein the sensor component has a winding that consists of a single conductor loop.

13. The inductive measuring transducer as defined in claim 9, wherein inductive coupling of the coil of the pickup component and of the coupling coil is strengthened, by a core made from a material of high magnetic permeability.

14. The inductive measuring transducer as defined in claim 1, wherein the closed conductor loop is configured substantially as a curve trace comprising two sections extending in parallel to a measuring direction, the at least one inductive sensor being movable in the measuring direction so as to induce a voltage in the conductor loop, the resistors being connected in at least two groups to sides of the trace that extend in the measuring direction, the resistors having their second ends brought out to connections from which position-dependent voltages can be picked off.

15. The inductive measuring transducer as defined in claim 14, wherein voltage pickoffs are provided on sides of the closed conductor loop that extend crosswise to the measuring direction, for picking up a voltage induced by the inductive sensor which is independent of the position of the inductive sensor within the measuring range.

16. The inductive measuring transducer as defined in claim 14, wherein two inductive sensors are provided that induce substantially equally high, but opposed voltages in the closed conductor loop.

17. The inductive measuring transducer as defined in claim 14, wherein at least two inductive sensors are arranged on respectively opposite sides of the conductor loop in positions offset by a length of that section of the conductor loop that extends in the measuring direction, the inductive sensors, while within the range of the conductor loop, generate an alternating magnetic field approximately equal amplitude and a direction that ensures that no phase reversal will occur in the conductor loop.

* * * * *